(No Model.)
E. A. DELANO.
DRILLING MACHINE.
No. 307,749. Patented Nov. 11, 1884.
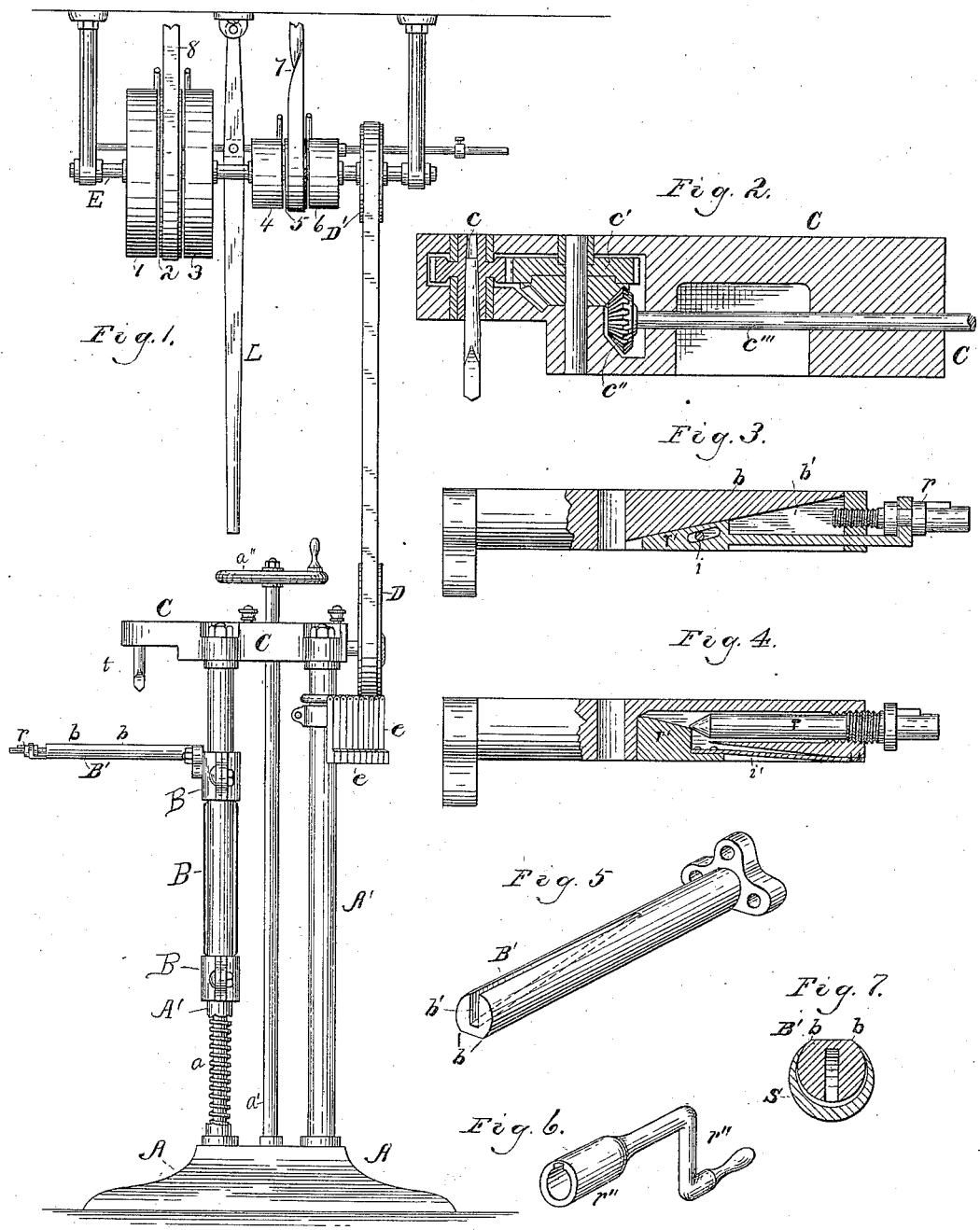
Witnesses,
Henry Frankfurter,
W. S. Baker.
Inventor:
Eben A. Delano
per. Merriam & Whipple
Attorneys.

UNITED STATES PATENT OFFICE.

EBEN A. DELANO, OF CHICAGO, ILLINOIS.

DRILLING-MACHINE.

SPECIFICATION forming part of Letters Patent No. 307,749, dated November 11, 1884.

Application filed August 27, 1883. (No model.)

*To all whom it may concern:*

Be it known that I, EBEN A. DELANO, of Chicago, in the State of Illinois, have invented a certain new and useful Machine for Drilling and Tapping Pulleys for Set-Screws, of which the following is a specification.

The object is to furnish a machine designed especially for drilling and tapping pulley-hubs, flanges, gears, and other like devices which are secured to their shafts by set-screws.

My machine comprises a projecting head or arm which has the drill-pinion located in the end, the head or arm being hollow and inclosing the intermediate mechanism which operates the drill, and a supporting-mandrel projected in line with and at right angles to the drill, the plan of arrangement of the mandrel with reference to the arm being such that when the bore of the pulley is placed on the mandrel the projecting end of the arm which supports the drill will come between the hub and the rim of the pulley. The mandrel is made expansible for the purpose of tightening the pulley on the same to hold it for drilling the hole in the hub, and is supported on a sliding head arranged to move the mandrel toward and from the drill. The mandrel is also cut away on the side toward the drill, or so formed as to present two supporting ridges or angles which lie in a plane to which the drill is perpendicular, the ridges or angles being on opposite sides of and equidistant from the axial line of the drill produced, and serving the purpose of readily adjusting the pulley in position to be drilled.

The machine is designed to be operated in reverse directions by any suitable means or power, the operation being rapid in a left-hand direction and slow in the reverse or right-hand direction. The drilling is done with a rapid motion, but the tapping requires a slow motion, and I employ a left-hand drill for this reason, and because the operation of reversing the machine may be made to change the motion from fast to slow, and vice versa, and the rapid movement applied to a left-hand drill may also be employed with advantage in turning out the tap after cutting a right-hand thread in which the slow right-hand motion was used.

The accompanying drawings illustrate the invention. Figure 1 shows a side elevation of my machine. Fig. 2 is a vertical longitudinal section through the drill-head enlarged. Figs. 3 and 4 are enlarged sectional views of the mandrel. Fig. 5 is a perspective showing the under side of the mandrel. Fig. 6 is a crank. Fig. 7 is a cross-section of the mandrel having an eccentric shell placed upon it.

A is a base provided with four uprights, A'. A sliding head, B, is secured to two of the uprights, so that it may be moved up and down thereon. It is operated by a screw, $a$, pivotally connected in the base, and geared in the interior of the base by common spur-gears to a shaft, $a'$, which has a crank or hand wheel, $a''$, by means of which the screw may be operated to move the sliding head toward or from the drill $t$. To the sliding head the expansible mandrel B' is secured, and thereby moved toward and from the drill. Corners or supporting-ridges $b\ b$ on the mandrel are extended on opposite sides of and equidistant from the center line of the drill and in a plane at right angles thereto, so that the circular bore of a pulley, when rested upon or brought against such ridges, shall bring the axis of the pulley in line with the center line or axis of the drill produced and at right angles thereto without other aid. The mandrel may be expanded to tighten the pulley thereon by a screw-rod, $r$, projecting from the end of the mandrel, and operating a sliding wedge or a key, $r'$, so as to cause it to project from a slot, $b'$, in the under side of the mandrel. When the rod is screwed in by a crank, $r''$, the wedge or key is forced out.

In Fig. 3 the wedge is held in the slot by a pin, $i$, passing through an oblong hole in the wedge; but in Fig. 4 the key is held in by a spring, $i'$, and forced out by the bevel-point of the rod as it is screwed in. The form shown in Fig. 4 is preferable for the smaller sizes of mandrel.

Mandrels of two or three different sizes may be used with a series of blocks, $e$, varying from one-sixteenth to an inch in thickness, to be placed between the interior wall of the pulley-bore and the expanding part of the mandrel, to adapt the machine to pulleys of any size of bore, the mandrel being secured to the sliding head by bolts, so as to be easily taken off to change sizes. An eccentric shell, s, may also be used on the mandrel for adapting it to a large bore in the pulley. The mandrel has an opening opposite to the drill to prevent the drill striking it.

C is the drill head or arm supported by the upright. One end of the head is made small and projected over or nearly parallel with the mandrel, so as to come inside of the rim of the smallest size of pulley when on the mandrel. The drill or tap is set in a small hollow shaft or pinion, c, journaled in the projecting end of the head or arm and connected by gearing $c'$ $c''$ and shaft $c'''$ to an operating-pulley, D. A belt connecting pulley D with a pulley, as D', on a shaft, as E, arranged overhead, and provided with a set of large pulleys, 1 2 3, and a set of small pulleys, 4 5 6, may be employed in operating the machine. Pulleys 1 and 5 are keyed to the shaft, the others being loose upon it. The belts 7 and 8 connect with the main line or power shaft, and by means of the lever L said belts are simultaneously shifted upon both sets of said pulleys. When said belts are upon 1 and 4, the machine is driven by 1 and runs slowly. When upon 2 and 5, it is driven by 5 and runs rapidly in the opposite direction as belt 7 is crossed, and when upon 3 and 6 the machine stops, the belts both being upon loose pulleys. Motion is given to pulley 5 in the direction required to operate the drill in a left-hand direction and to 1 in the reverse direction for tapping.

I do not wish to be understood as limiting my invention to the specific means or mechanism shown for giving alternate rapid and slow motions in reverse directions to pulley D or its shaft, as this may be accomplished in various well-known ways.

The operation of the machine is as follows: The belts 7 8 being upon pulleys 3 6, the pulley to be drilled and tapped is put upon the mandrel B' and moved along until the point to be drilled comes under the drill. The crank $r''$ is then attached and the rod $r$ is screwed in until the wedge or key $r'$ tightens against the side of the bore sufficiently to hold the pulley fast. If the space between the bore and mandrel is too large for this to be done readily, one of the blocks $e$, or the eccentric shell $s$, is applied in the space between before expanding. The circular bore of the pulley, resting upon the ridges $b$ $b$ of the mandrel, brings the axis of the pulley in proper line with the drill and at right angles thereto. By means of the wheel $a''$ the pulley is raised up to and fed against the drill. By means of lever L the belts are now shifted to pulleys 5 and 2. The former, being a fixed pulley, sets the machine in motion for drilling. The drilling done, the belts are further shifted to pulleys 4 and 1; the latter, being fixed, operates the machine in the reverse direction and quite slowly. The drill is now removed and the tap applied in its place to tap the hole drilled. When the tapping is done, the belts are shifted back to pulleys 2 and 5, applying the rapid motion to turn the tap out, when the belts are further shifted to pulleys 3 6 and the machine stops.

What I claim is—

1. A machine for drilling and tapping pulleys for set-screws, comprising a projecting arm, as C, having a pinion, as c, in the projecting end, provided with the drill-socket, gears $c'$ $c''$, and shaft $c'''$, connected with an operating-wheel, in combination with a supporting-mandrel, as B', projected in line with and at right angles to the drill, and supported on a sliding head, as B, substantially as and for the purpose specified.

2. In a machine for drilling and tapping pulleys for set-screws, an expansible supporting-mandrel projected in line with and at right angles to the drill, and supported on a sliding head for moving the mandrel toward and from the drill.

3. In a machine for drilling and tapping pulleys for set-screws, a supporting-mandrel having two supporting ridges or angles, as $b$ $b$, projected on opposite sides of and equidistant from the axis of the drill produced, and in a plane at right angles thereto.

4. In a machine for drilling and tapping pulleys for set-screws, a projecting arm, as C, provided with the drill-pinion $c$ and gears $c'$ $c''$, and shaft $c'''$, substantially as shown.

5. In a machine for drilling and tapping pulleys for set-screws, a projecting arm, as C, having a drill-pinion, as $c$, in the projecting end geared to a shaft, as $c'''$, within the arm, substantially as specified.

6. In a machine for drilling and tapping pulleys for set-screws, a projecting arm, as C, having a drill-pinion, as $c$, in the projecting end, gears $c'$ $c''$, and shaft $c'''$, in combination with mechanism for communicating rapid left-hand and by reversal slow right-hand movement to the drill-pinion, substantially as and for the purpose specified.

E. A. DELANO.

Witnesses:
JOHN H. WHIPPLE,
JOSEPH W. MERRIAM.